United States Patent [19]

Lindsay et al.

[11] Patent Number: 5,030,273
[45] Date of Patent: Jul. 9, 1991

[54] FURNACE-PLASMA ARC TORCH-SUPERVISORY CONTROL SYSTEM FOR RECOVERY OF FREE ALUMINUM FROM ALUMINUM DROSS

[75] Inventors: Richard D. Lindsay; Jack L. Dochterman; Terry L. Moore; David P. Camacho, all of Raleigh, N.C.

[73] Assignee: Plasma Energy Corporation, Raleigh, N.C.

[21] Appl. No.: 408,380

[22] Filed: Sep. 18, 1989

[51] Int. Cl.$^5$ ............................................ C22B 21/02
[52] U.S. Cl. ...................................... 75/10.21; 266/78
[58] Field of Search .................... 75/24, 10.21; 266/78

[56] References Cited

U.S. PATENT DOCUMENTS 4,177,060 12/1979 Tylko .................................. 75/10.21
4,523,949 6/1985 Gower ...................................... 75/24

Primary Examiner—Peter D. Rosenberg
Attorney, Agent, or Firm—A. W. Breiner

[57] ABSTRACT

An assembly for the recovery of aluminum metal from aluminum dross comprising a rotary furnace, a plasma arc torch, and a supervisory control system for tying together and automatically controlling the operation of the rotary furnace and plasma arc torch is described. The invention provides recovery of aluminum metal from dross in an efficient and economical process.

4 Claims, 5 Drawing Sheets

PROCESS CONTROL SCHEME I

PROCESS CONTROL SCHEME II

PROCESS CONTROL SCHEME III

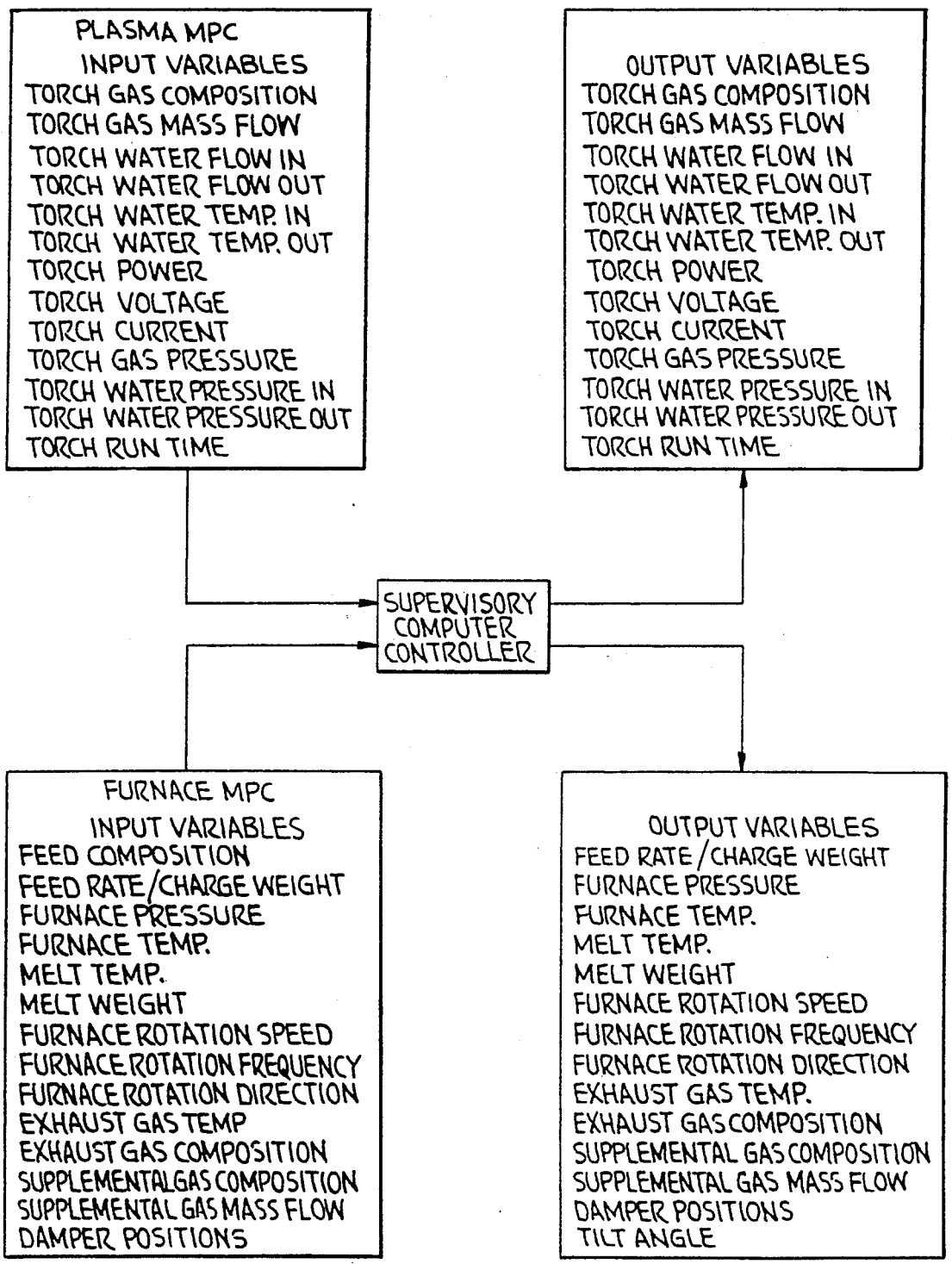

FURNACE-PLASMA ARC TORCH-SUPERVISORY CONTROL SYSTEM FOR RECOVERY OF FREE ALUMINUM FROM ALUMINUM DROSS

RELATED APPLICATION

This application relates to commonly assigned Richard D. Lindsay, U.S. Ser. No. 07/281,049 filed Dec. 8, 1988 entitled "Process for Recovery of Free Aluminum from Aluminum Dross or Aluminum Scrap Using Plasma Energy"; and Richard D. Lindsay et al, U.S. Ser. No. 408,388, now U.S. Pat. No. 4,997,476 concurrently filed with this application entitled "Recovery of Free Aluminum from Aluminum Dross Using Plasma Energy Without Use of a Salt Flux."

FIELD OF INVENTION

This invention relates to the recovery of free aluminum from aluminum dross. More particularly, the invention relates to an assembly for the recovery of aluminum metal from aluminum dross comprising a rotary furnace, a plasma arc torch, and a supervisory control system for tying together and automatically controlling the operation of the rotary furnace and plasma arc torch. The invention further includes the process for the recovery of aluminum metal from dross using the assembly.

BACKGROUND OF INVENTION

When a body of aluminum is melted in a furnace for purposes of casting or the like, dross forms on the surface of the molten aluminum which must be periodically removed, for example by skimming or similar operation. The removed dross contains substantial amounts of free aluminum as well as aluminum oxides, such as bauxite, and certain other metals and metal salts, such as magnesium, manganese and lithium, depending on the nature of the aluminum or aluminum alloy being treated. The dross may also include some nitrides and chlorides, possibly due to the manner in which the dross is treated.

It is recognized in the industry that for economical reasons it is critical to recover in usable form the free aluminum, aluminum oxide, and other by-product metals from the dross. It is also recognized, however, that the recovery of these materials from dross is difficult due, inter alia, to the nature of the dross and the reactivity of aluminum. In a typical recovery process the dross is normally melted at high temperatures in a furnace. However, at elevated temperatures the dross, particularly the free aluminum in the dross, is easily susceptible to oxidation and, moreover, commonly tends to ignite and burn in the presence of air. The burning of the aluminum can decrease substantially the amount of aluminum recovered.

To solve the problems associated with treating dross and improve the efficiency of aluminum recovery, it has been proposed to heat the dross in an induction furnace in the presence of a salt flux. See, for example, McLeod et al. U.S. Pat. No. 3,676,105. The use of a salt flux, which tends to agglomerate the free aluminum, is not desirable because of high costs and in that the salt, which tends to be water-leachable, in turn, must be separated from the aluminum, leading to environmental problems.

Lindsay et al, commonly assigned U.S. Ser. No. 408,388, now U.S. Pat. No. 4,997,476 concurrently filed, describes a process for the recovery of free aluminum and aluminum oxides from aluminum dross comprising heating the dross in a high-temperature rotary furnace using a plasma arc torch, preferably fed with air as the arc gas, without use of an added salt flux. It was found, surprisingly, that the use of a rotary furnace heated with plasma energy from a plasma gun or torch will separate and agglomerate the free aluminum from the dross residue without need for a salt flux. It is preferable that the plasma torch or gun at the time of start-up is directed directly at the charge being melted and subsequently directed towards the walls of the furnace, rather than directly into the charge, in order that the charged dross is heated indirectly by the furnace walls. This indirect heating of the dross eliminates or reduces the nitriding effect when using nitrogen as the plasma torch arc gas, or the formation of oxides when using air as the plasma torch arc gas. Preferably the rotating furnace will also include a tilting mechanism which is advantageous for tapping of the free molten aluminum and removal of solid residue from the furnace.

Lindsay et al also found that in the use of the rotating furnace heated with plasma energy, aluminum oxides—either initially present in the dross or formed during the dross treatment—build up on the walls of the furnace to line the furnace. The free aluminum which melts at a lower temperature than the oxides agglomerates within the interior of the built-up lining where it can easily be removed from the furnace by tilting of the furnace. The built-up aluminum oxide must be periodically removed, for example after each run or after two or three runs, from the walls of the furnace.

As further set forth in Lindsay et al, after the initial treatment of the dross in the rotary furnace and removal of molten free aluminum, it can be desirable to oxidize the non-metal components in the rotary furnace by heating with the plasma arc torch operated on an oxidizing gas such as oxygen to convert the non-metal components to substantially pure metal oxides. In the processes of Lindsay et al, it is desirable that the various stages of the process be automatically sequenced and controlled.

SUMMARY OF INVENTION

The present invention provides a supervisory control system for simultaneously controlling and interrelating the operation of the rotary furnace and plasma arc torch throughout the desired sequence of operations of a dross treatment process. The supervisory system utilizes a combination of factors which are sensed in the dross treatment process which are stored in a microprocessor for keying the sequential operations of the system. These factors include hydrogen evolution when operating on nitrogen as an arc gas, the melt temperature of the dross being treated, the weight of the charge of dross being treated, the presence of various chemicals or components in the furnace discharge, etc.

Accordingly, the microprocessor used in the supervisory control system must be capable of sensing, directing, and controlling a series of events and operations for the operation of the plasma arc torch, including adjusting and controlling the power supply, the water supply and the arc gas supply, on a continuous basis concurrent with the continuous control of the functions of the rotary furnace, including the hydraulics for rotating and tilting the furnace, the providing of supplemental gas to the furnace, exhausting of gases in sequence, as well as the cycle times of a batch process, etc. Additionally, the supervisory control system will include safety control features for shutting down the system in the event of abnormalities. These various features of the invention will be apparent from the drawings and following more detailed description.

THE DRAWING AND DETAILED DESCRIPTION

A presently preferred embodiment will be described in reference to the drawing wherein FIG. 1 is a flow diagram of the process of the present invention;

FIG. 8 sets forth in block form the supervisory computer controller functions of the plasma arc torch and the rotary furnace.

Figure 1:
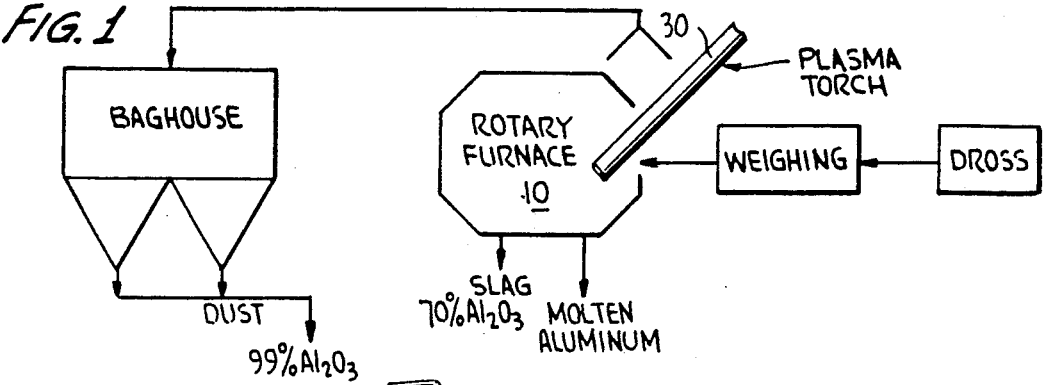

Referring to FIG. 1, dross is weighed and charged into a furnace 10. After charging the dross to the furnace, a plasma arc torch 30 is brought into position in the furnace and the dross heated to the molten state. The molten free aluminum is recovered. The dust recovered from the furnace which is about 99% aluminum oxide is passed to a bag house. The slag or residue which forms on the furnace walls is scraped from the furnace and is preferably recharged to the furnace with additional dross, or is further treated with a plasma torch, as will be hereinafter developed, to provide useful non-metallic products (NMP's).

Figure 2:
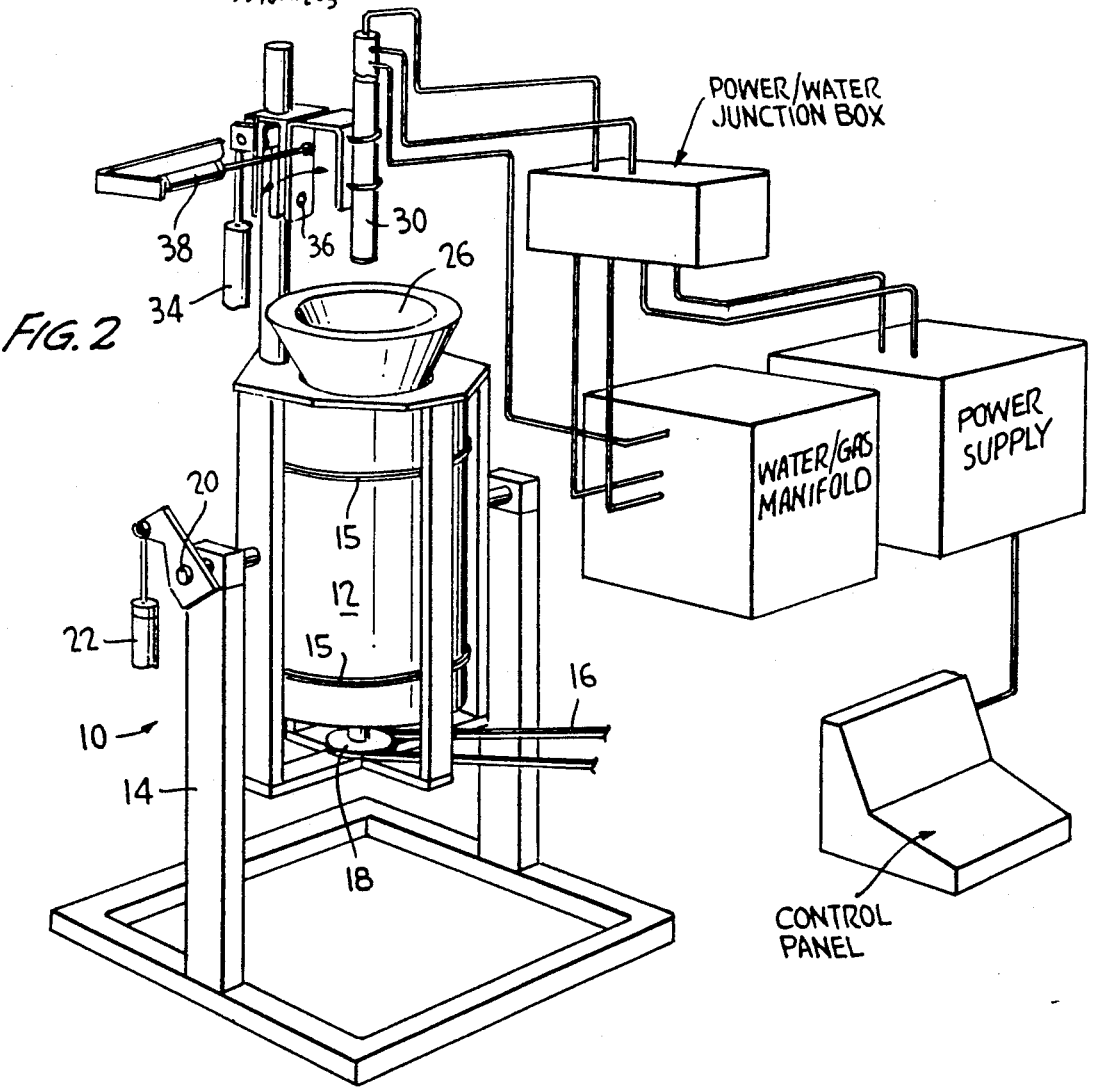
FIG. 2 is a schematic drawing of a preferred rotary furnace, plasma arc torch, and supply system used in the process of this invention.
Figure 3:
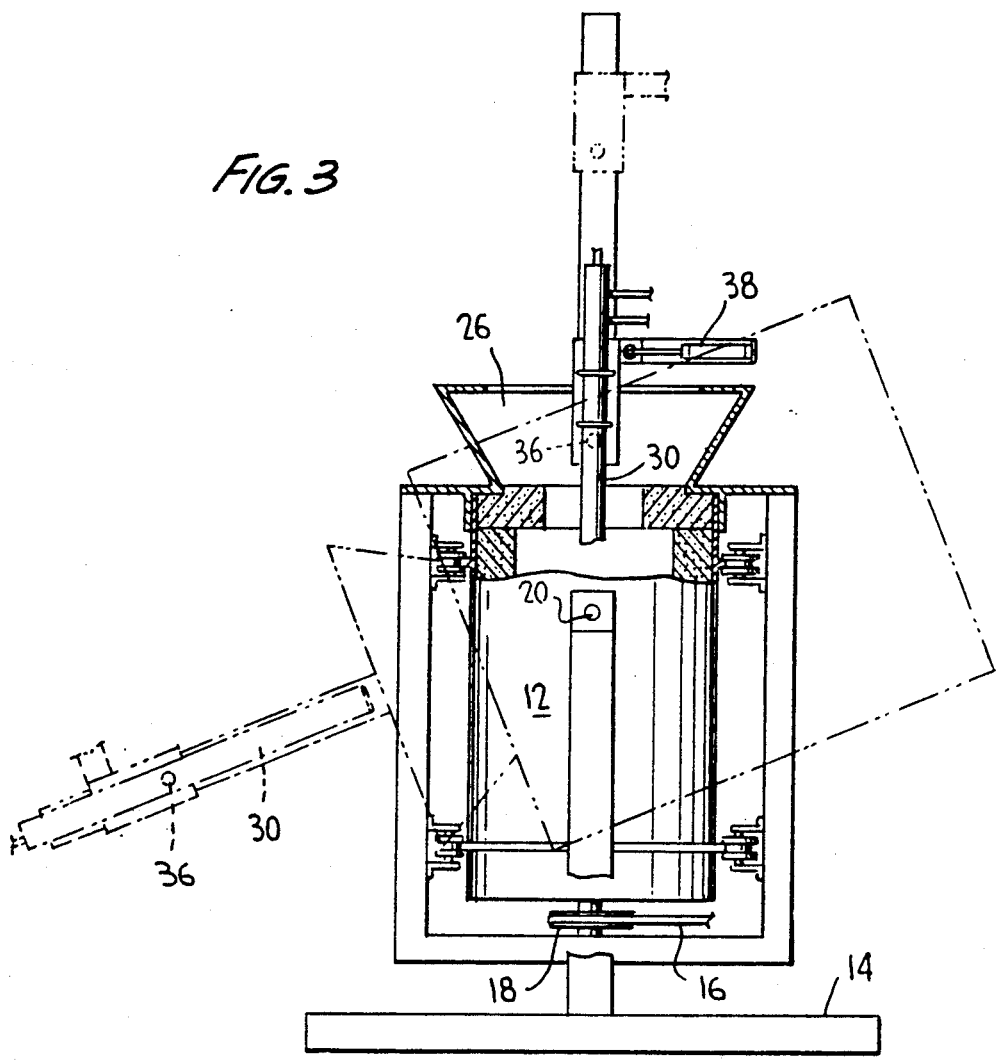
FIG. 3 is a side elevational view of the furnace and plasma torch shown in FIG. 2.
Figure 4:
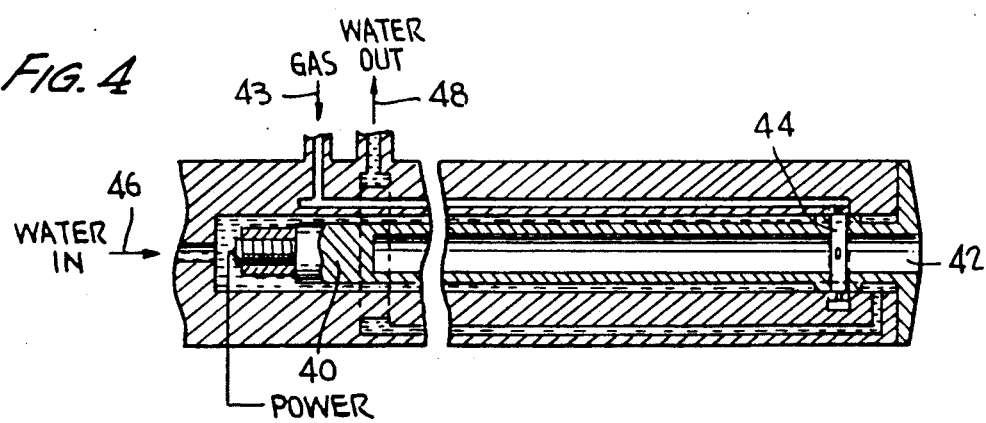
FIG. 4 is a schematic cross-section of the plasma arc torch used in the present invention.

The preferred furnace, as shown in FIGS. 2 and 3, is a tilting, rotating furnace. Thus, the furnace comprises a rotating drum 12 on frame 14 which is driven on rails 15 by belt 16 and pulley 18 with an electric motor (not shown). As is also shown in FIGS. 2 and 3, the drum, carrying torch 30, tilts about pivot point 20, preferably actuated by an air cylinder 22, to permit convenient recovery of the free molten aluminum.

Plasma torch 30 is removably positioned in cover 26 of furnace 10. The torch on frame 14 is moved vertically into and out of position by an air cylinder 34. Once in position in the furnace, the torch can be swung back and forth within the furnace in order to cover the entire furnace area around pivot point 36 by activation of air cylinder 38. The torch is positioned independent of drum 12 to permit rotation of the drum.

Figure 5:
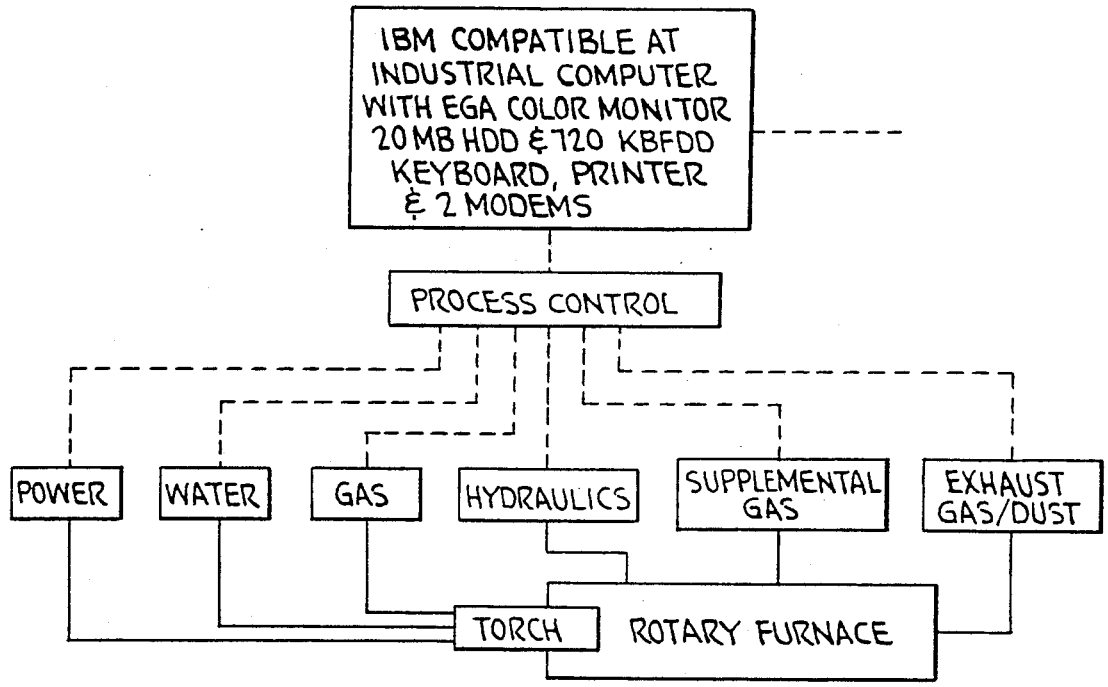
FIG. 5 is a first process control scheme (I)

Utilizing the supervisory control system according to the present invention, the entire operation can be controlled by computer automatically. In a first process control scheme as illustrated in FIG. 5, an IBM compatible AT industrial computer with EGA color monitor, 20 MB HDD and 720 KBFDD keyboard, printer, and two modems is tied into a process controller which separately, but simultaneously, controls the electrical power, water supply, and arc gas to the plasma torch. Concurrently the same process controller controls the hydraulics, supplemental gas supply, and exhaust gas/dust removal for the rotary furnace.

Figure 6:
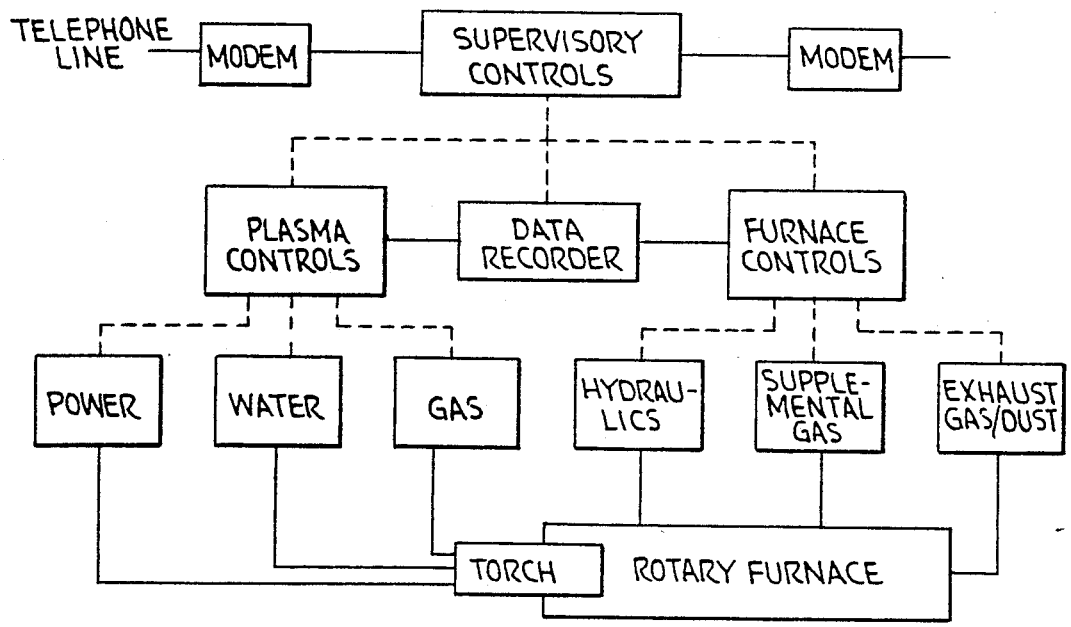
FIG. 6 is a modified process control scheme (II)

The process control scheme illustrated in FIG. 6 differs from the process control scheme shown in FIG. 5 primarily in that it uses two process controllers. Trouble-shooting of the system is thus simplified in that a separate process controller controls the functions of the plasma arc torch and the functions of the rotary furnace. The two process controllers, in turn, are tied together through a data recorder.

Figure 7:
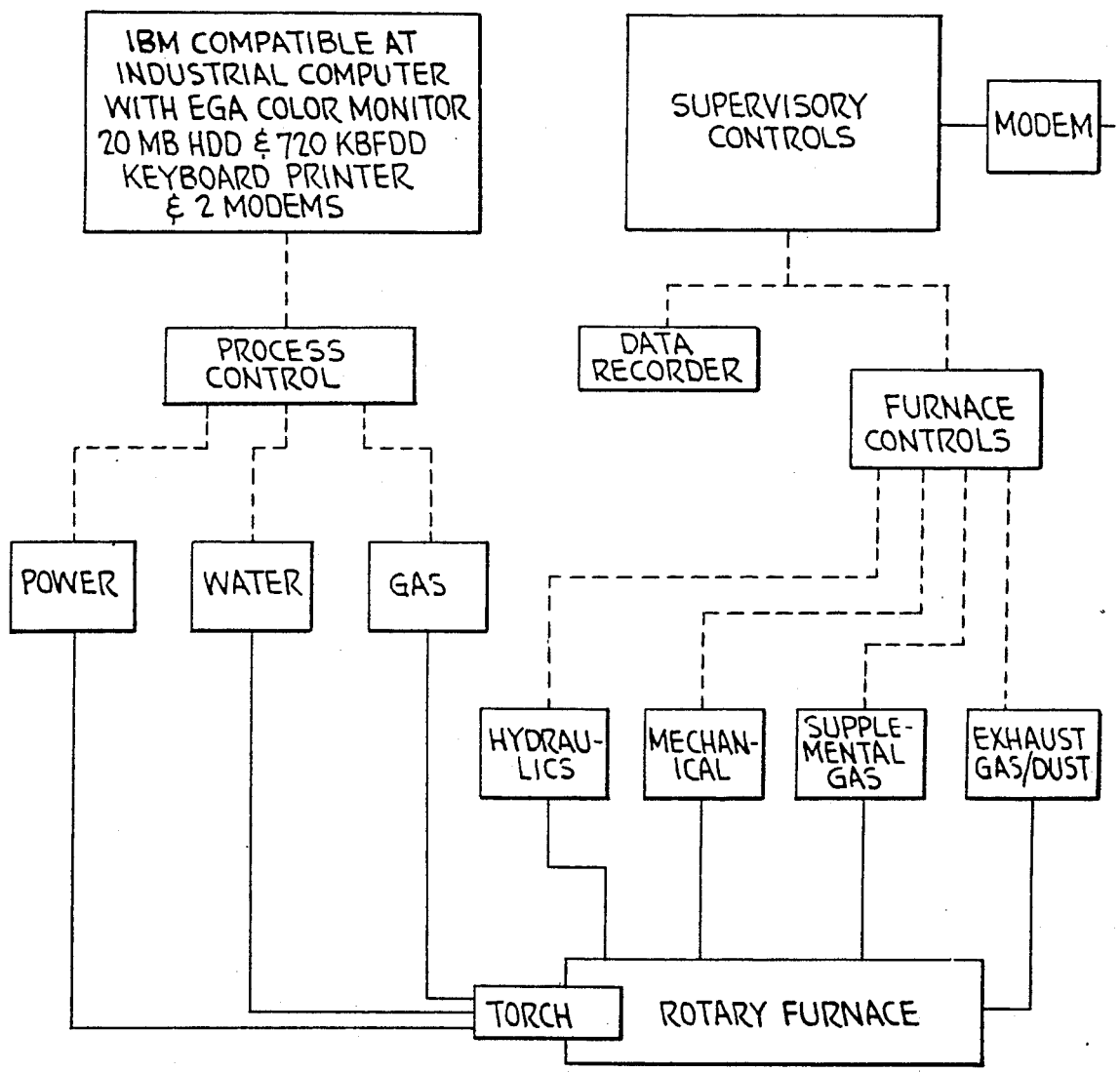
FIG. 7 is still another modified process control scheme (III)

The process control scheme as illustrated in FIG. 7 is effectively a combination of a part of the scheme of FIG. 5 and a part of the scheme of FIG. 6.

In operation, the supervisory control scheme of each of FIGS. 5, 6 and 7 is designed to control the total dross treatment process, tying together the furnace and the plasma torch system. The system is set in operation with the charging of the dross to the furnace. During the cycle the supervisory control system acts on what is in its memory bank and the measured process variables. If the charge which is sensed is exactly the same as a charge it has earlier seen, the computer will select those operating conditions previously utilized for such charge. If what it sees is not exactly the same as previously sensed but between two previously sensed charges, the computer system will calculate and adjust the operating parameter accordingly For example, if what the computer sees is close to an earlier charge, it will adjust to the process conditions of the earlier charge. If totally different, the computer will signal that it requires adjustment and will close down until adjustments are made. The computer will require reactuation before again proceeding. The computer system, therefore, will act alone and proceed through an entire sequence of operations as long as all factors are normal. In the event the factors are abnormal, the system will call for help and only proceed after adjustments and reactuation is made.

FIG. 8 sets forth in block form the various supervisory computer control functions, both input variables and output variables which can be controlled. These functions are set into the microprocessor based on measured process variables which occur in the dross treatment process. Some examples of important process variables for control are 1. The hydrogen sampled in the furnace stack at times is above 1000 ppm, but at the time the batch is ready to tap it drops to below 20 ppm.

2. When operating with nitrogen as the arc gas, the melt temperature begins to climb slowly after reaching 650° C., but resumes a rapid climb at 700° C., going from 700° C. to 750° C. in two or three revolutions of the furnace, i.e., one to two minutes.

3. When rotating intermittently, the furnace stack temperature climbs steadily and will peak when melting begins at a temperature of 650° C.-850° C.; or if the furnace is rotated continuously it will climb slower, and after it reaches 1000° C. it will drop. After this drop it will increase again until it peaks, then it drops quickly at the time the batch is ready to tap.

4. The batch weight may decrease or remain stable with a slight gain until the batch begins to melt and the temperature reaches approximately 650° C. After this point there is a quick weight gain, and the batch is ready to tap when it gains approximately 100 to 150 pounds more than the original weight when operating on air, and 50 to 100 pounds on nitrogen.

5. The stack gas analysis will see a sharp variation at the point the batch is ready to tap.

The system or assembly for use according to the invention must include a load cell to calculate and record the amounts which are tapped and the amount of residue removed. This value can be inputted back into the computer to adjust the processing equation. It is desirable that the computer include means to record a heat identification number to associate with the data from each run; means to monitor the angles of rotation of the furnace; a means to monitor furnace pressure and exhaust pressure; a means to control the tapping position interfaced with loading control; and means to blend oxygen/nitrogen in the arc gas through the addition of supplemental air/oxygen/nitrogen, depending on the needs of the specific dross. This blending can be adjusted either through the torch or into the furnace. This same control can also control argon blanketing of the material in the furnace to kill the reaction taking place at a predetermined time. The computer should also include means to monitor all normal torch functions including voltage, amps, power, gas and water flow, temperatures of the offgases and water, both in and out temperatures, gas enthalpy, torch and power supply loss—both electrical and thermal, torch efficiency, gas and water pressures, and torch gas pressure. The computer should also include means to allow additional pressure monitoring at the outlet of the torch and an averaged water balance between inlet and outlet, as well as means to allow for control of torch position in the furnace and closure of a door to seal the hole where the torch was removed. It can include means to interconnect a second microprocessor to provide redundancy of critical alarms and shutdowns with automatic communication and comparison between the two, as well as means, in an emergency shutdown condition where the torch is operating, to ground the power supply and withdraw the torch from the furnace and to flood the furnace with argon. It can include means shutting off the water inlet and the water outlet under emergency conditions; means to monitor the baghouse temperatures and parameters and provide alarms relating thereto, and control of the flow through the baghouse. Once a combination of such functions are set into the microprocessor based on a combination of relevant factors, the complete automatic control of the total process is possible, including the initial charging of the furnace with dross, lowering of the torch into position, the starting of the plasma torch and directing the plasma torch in the furnace drum 12; supplying of electrical power, coolant water and air arc gas to torch 30, and rotation of the furnace drum 12 are also all controlled by the microprocessor. When the charge is heated to the molten condition, the heating is continued with the plasma torch being directed towards the wall of the furnace for a period of one hour. The microprocessor then directs that the torch be withdrawn and the molten aluminum discharged by tilting the furnace drum. The residual refractory-like product which remains in the furnace and which is composed of mixed metal oxides and/or metal nitride, as well as minor amounts of aluminum chloride, magnesium nitrides and trapped aluminum, can be subjected to a controlled plasma oxidation. Thus, the microprocessor directs that the residual refractory-like product is treated in the plasma-furnace system whereby the plasma torch arc gas is switched and utilized with oxygen or steam to oxidize the residue. The resultant by-products are subsequently removed from the furnace.

As will be apparent to one skilled in the art, various modifications can be made within the scope of the aforesaid description. Such modifications being within the ability of one skilled in the art form a part of the present invention and are embraced by the appended claims.

It is claimed:

1. An assembly for recovery of aluminum metal from aluminum dross comprising (a) a rotary furnace; (b) a plasma arc torch, and (c) a supervisory control system; said control system being interconnected with each of said furnace and said torch, and containing means for simultaneously controlling at least one of the hydraulic means, supplemental gas means and exhaust gas means of said furnace and at least the power supply and arc gas supplied to said torch.

2. The assembly according to claim 1 wherein said furnace includes hydraulic means, supplemental gas means, and means for controlling the exhaust gas of said furnace; and each of these means is controlled by said control system.

3. The assembly according to claim 1 or 2 wherein said torch includes means for controlling the power to said torch, water to said torch, and arc gas to said torch; and each of these means is controlled by said control system.

4. The assembly according to claim 1 or 2 or 3 wherein said supervisory control system includes a microprocessor.

* * * * *